United States Patent
Vinyard

Patent Number: 5,297,745
Date of Patent: Mar. 29, 1994

[54] REAR-MOUNTED MANURE GATHERING MACHINE AND METHOD OF HANDLING MANURE

[76] Inventor: Owen Vinyard, 4947 Highway 190 E, Hammond, La. 70401

[21] Appl. No.: 812,029

[22] Filed: Dec. 23, 1991

[51] Int. Cl.⁵ .................................................. B02C 25/00
[52] U.S. Cl. ................................. 241/101.7; 414/476; 56/16.6
[58] Field of Search ............... 414/476, 502; 198/518, 198/519, 550.1; 280/43.14, 43.23, 43.24; 241/46.08, 46.11, 101.7

[56] References Cited

U.S. PATENT DOCUMENTS

| | | |
|---|---|---|
| 2,587,092 | 2/1952 | Bartsch . |
| 2,792,255 | 5/1957 | Bellows . |
| 2,867,386 | 1/1959 | Edwards et al. ............... 241/46.11 |
| 2,944,350 | 7/1960 | Bartsch . |
| 3,294,407 | 12/1966 | Vander Pol . |
| 3,348,652 | 10/1967 | Vinyard ........................ 414/502 X |
| 3,412,943 | 11/1968 | Lewis et al. . |
| 3,483,960 | 12/1969 | Wightman et al. . |
| 3,595,363 | 7/1971 | Vinyard . |
| 3,635,492 | 1/1972 | Mauldin ........................... 414/476 |
| 3,738,581 | 6/1973 | Gallauresi et al. ......... 241/46.11 X |
| 3,866,935 | 2/1975 | Nelson . |
| 3,876,055 | 4/1975 | Tyznik . |
| 3,944,098 | 3/1976 | Foote . |
| 3,980,236 | 9/1976 | Richardson . |
| 4,013,224 | 3/1977 | Carter . |
| 4,014,271 | 3/1977 | Rohlf et al. . |
| 4,056,226 | 11/1977 | Hodgson . |
| 4,061,273 | 12/1977 | Richardson . |
| 4,079,892 | 3/1978 | Hodgson . |
| 4,108,380 | 8/1978 | Richardson . |
| 4,232,616 | 11/1980 | van der Lely . |
| 4,289,439 | 9/1981 | Hansson . |
| 4,318,658 | 3/1982 | McIntyre ........................ 414/476 X |
| 4,406,413 | 9/1983 | Houle ........................ 241/46.11 X |
| 4,451,052 | 5/1984 | Gagelin . |
| 4,479,347 | 10/1984 | Larsen et al. . |
| 4,527,810 | 7/1985 | Nielsen . |
| 4,632,626 | 12/1986 | O'Shea . |
| 4,711,403 | 12/1987 | Gregory, Sr. ............... 241/101.7 X |
| 4,732,332 | 3/1988 | Schitemaker . |
| 4,897,183 | 1/1990 | Lewis, Jr. et al. . |
| 4,911,368 | 3/1990 | Nishimori ..................... 241/46.08 |

*Primary Examiner*—Mark Rosenbaum
*Assistant Examiner*—Frances Chin
*Attorney, Agent, or Firm*—Wood, Phillips, VanSanten, Hoffman & Ertel

[57] ABSTRACT

A more even distribution of manure during spreading, a more efficient pickup of loose and gummy material, a more efficient pickup of manure in irregular feedlots, and avoidance of spillage of manure during transport are accomplished by employing a method of handling manure from a feedlot including providing a tank with a rear pickup mechanism. The tank and attached rear pickup mechanism rotate fore and aft by means of a pintle attached to a frame. The tank is so placed relative to the pintle that, as the frame is raised relative to the wheels, the tank first tilts backward and then forward, preventing overspills. The tank is partially filled with water and then the tank and pickup mechanism rotate to keep the mechanism in contact with the area to be cleaned. The mechanism then deposits manure from the area in the tank. A pump mixes the manure with the water to form a slurry and discharges the slurry from the tank.

21 Claims, 3 Drawing Sheets

REAR-MOUNTED MANURE GATHERING MACHINE AND METHOD OF HANDLING MANURE

BACKGROUND OF THE INVENTION

1. Technical Field

The present invention is directed toward a portable machine for picking up manure, whether dry or wet, from the ground, barn floors, or concrete feedlots, in order to clean such surfaces and to place the gathered manure in the machine. More particularly, this invention relates to such a machine in which a tractor pulls the machine and provides power through a power take-off shaft on the tractor. A hydraulic system within the tractor is used to provide the lifting means for allowing operation and transportation of the machine.

2. Background Art

Machines of this type which pick up manure from the ground and throw it into a wheeled receptacle from which it is transported to a disposal site are not new. Such machines are disclosed in my U.S Pat. Nos. 3,348,652 and 3,595,363.

The pick up mechanism of U.S. Pat. No. 3,595,363 was attached to the front of a manure spreader or slurry spreader and was lowered to the feedlot by the flexing of the yoke at a joint between the hitch and the container. The spreader thus tipped forwardly about its fixed axle. This mounting arrangement resulted in limited ground clearance in the raised position. The underside of the spreader would interfere with pavement, rocks or soil when being transported across irregular terrain damaging the spreader Variations in the moisture content of the manure picked up by such machines created inconsistencies in the density of the application of the manure to a farmer's field. The prior flail or auger-type manure spreaders varied in their application rate, depending on the moisture content.

Disposal sites for the manure from a prior art machine were limited to farmers' fields. During wet weather, when the farmers' fields were muddy, the manure gathering machine could not be operated in the wet field. Also, if crops were growing on all the farmers' fields, the manure could not be spread onto the farmers' fields. When these conditions occurred, use of a manure pickup machine was prohibited.

Prior pickup machines, such as machines disclosed in my U.S. Pat. Nos. 3,348,652 and 3,595,363, were trailing-type machines pulled by a tractor with the pickup mechanism in the front of the machine. With these machines, the manure in the corners of the feedlots and in alleys within the feedlots could not be reached by the pickup mechanisms of these machines.

SUMMARY OF THE INVENTION

In one aspect of the present invention, a method of handling manure from a feedlot includes providing a portable tank with a manure pick up mechanism. A pump may be provided to agitate or unload the manure. The tank is partially filled with water as by means of the pick up mechanism prior to the removal process. The tank and manure pick up mechanism are then transported across the area to be cleaned. The pick up mechanism deposits manure from the area traversed into the tank and the manure is mixed in the tank with the water by means of the pump to form a slurry. The tank is then emptied into a lagoon or spread across a farmer's field.

In another aspect of the invention, a manure gathering machine for a feedlot comprises a mobile tank which moves over the ground to the area to be cleaned and has a rear end defined by a rear wall with a filling opening at the upper portion of the rear wall. Behind the rear wall of the tank is a manure pick up mechanism for picking up the manure from the ground as the tank moves to the area. The manure is directed upward and forward to the filling opening of the tank. The manure pick up mechanism operates so that manure which does not reach the tank falls to the ground between the rear wall of the tank and the manure pick up mechanism. This arrangement allows manure that falls to be picked up again as the manure pick up mechanism moves forward.

In a further aspect of the present invention, a transportable manure gathering machine for a feedlot consists of a frame which has a longitudinal axis. The frame is mounted on wheels, one on either side of the axis, for movement of the manure gathering machine. A receiving tank is mounted on the frame and pivots about an axis transverse to the longitudinal axis of the frame. The receiving tank has a filling opening at the top of one end. A pick up mechanism is located at one end of the receiving tank for lifting the manure to the filling opening. As the manure gathering machine is operated, the tank pivots about the transverse axis and the pick up mechanism follows the ground contour in order to assure continual contact through an irregular contour.

In yet another aspect of the present invention, the manure gathering machine consists of a longitudinal frame on which a pintle is transversely located. A manure storage tank is pivotally attached to the pintle. A manure pick up mechanism is located on the rear of the tank and the mechanism has a series of three drums, each drum having paddles which throw the manure upwardly to the upper rear opening of the tank. A bell crank type lifting mechanism is used to raise and lower the tank and pick up mechanism to provide an operating mode and a transportation mode. The center of gravity of the tank is located rearward of the pintle so that, as the tank is raised, the front of the tank is first lifted, draining excess manure through the opening onto the feedlot. As the tank is further raised, stops located on the tank are engaged by the frame causing the tank to tilt in a frontward down position as the lifting mechanism continues to raise the tank. In a full upward position, the opening is located at the highest point of the tank to avoid spillage during transportation.

It is an object of the present invention to provide a method of handling manure from a feedlot in which the distribution of the manure onto a farmer's field can be uniformly and consistently performed. The method of partially filling the tank with water in quantities inversely proportionate to the moisture content of the manure prior to filling the tank with the manure from the feedlot provides for a slurry when mixed which is consistent tent in density and viscosity, regardless of the original moisture content of the manure. A slurry with a uniform moisture content and viscosity can be spread consistently and evenly over the farmer's field.

It is an object of the invention to provide a manure gathering machine for a feedlot that more efficiently will pick up the loose or gummy manure from a feedlot. In particular, inefficient pick up has been caused by loose manure falling from the paddles. In the configuration of this manure gathering machine, picked up manure which does not reach the tank falls to the ground between the rear wall of the tank and the manure pick up mechanism. The manure drops forward of the collecting area, to be picked up again. This configuration simply and efficiently eliminates the problem with manure that otherwise returns to the ground during the picking up process.

It is an object of the invention to provide a manure gathering machine that will consistently and efficiently clean a feedlot which contains rolling and irregular contour. The provision of a receiving tank on which a pick up mechanism is located on one end and which tank pivots about its center provides for a uniform, consistent and gentle contact between the manure gathering machine and the feedlot. The pick up device can float up and down to match the contour of the feedlot. This constant contact results in a much more complete and efficient cleaning of the feedlot.

It is an object of the invention to provide a manure gathering machine which will avoid spills during the manure transporting process. A unique bell crank lifting mechanism of the invention device, provides for the front of the tank to rise first as the tank is lifted, whereby any excess manure collected spills from the tank and is deposited back on the feedlot. As the tank is raised further, a second position is reached in which the rear of the tank rises above the front providing an upper position for the tank opening. This arrangement assures that the tank is not overfilled and that the opening is in an upward position so that the liquid will not spill during transport.

It is a further object of the invention to provide a manure gathering machine which can be used to clean the feedlot 365 days a year. The method of handling manure with this invention of mixing the manure with water to form a slurry that can be transported by means of a pump, permits the unloading of the manure into a lagoon. A lagoon can be so stationed adjacent the feedlot that muddy conditions of the field or crops growing on the field will not prevent the use of the mechanism. During wet weather or if all the fields have growing crops, the slurry in the machine can be unloaded by a pump into the lagoon.

It is yet another object of the invention to provide a manure gathering machine that will more efficiently and thoroughly clean the remote recesses of a feedlot. The positioning of the pickup mechanism in the rear of the trailing manure gathering machine allows the operator to back the manure gathering machine into corners and alleys within the feedlot, to lower the pickup of the manure gathering machine onto the feedlot and pull the machine forward, cleaning the corners or the alleys. The rear positioning of the pick up mechanism also permits the machine to be backed down a ramp into a lagoon to load manure that has been stored

BRIEF DESCRIPTION OF THE DRAWINGS

FIG. 3 is a side elevation view of the manure gathering machine of FIG. 1 with the tank in a partially lifted position;

FIG. 4 is a side elevation view of the manure gathering machine of FIG. 1 with the tank in the fully lifted transport position;

FIG. 5 is a sectional view along line 5—5 of FIG. 1;

DETAILED DESCRIPTION OF THE PREFERRED EMBODIMENT

Figure 1:
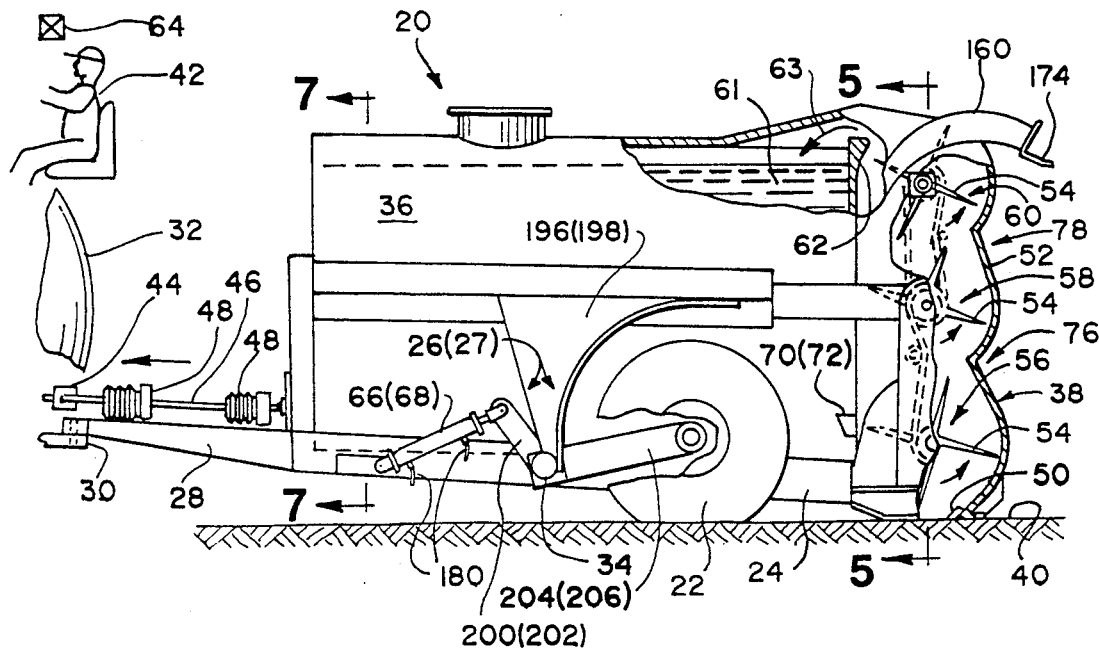
FIG. 1 is a side elevation view of the left side of the manure gathering machine in the lowered manure gathering position, with a portion of the tank wall and housing broken away.

An exemplary embodiment of a manure gathering machine 20 made according to the invention may be employed as illustrated in FIG. 1.

In the preferred embodiment as illustrated in FIG. 1, the manure gathering machine 20 includes two wheels 22 (only one shown in FIG. 1) which support a frame 24 by means of bell crank levers 26 and 27 (the parenthetical reference numerals on the drawing represent the comparable element on the right side of the machine) connected to the wheels 22 at one end and connected to the frame 24 at the middle of the levers 26 and 27. At the front of the frame 24 is a yoke 28 which connects the manure gathering machine 20 to a drawbar 30 of a tractor 32. On the frame 24, located centrally in the fore-aft direction, is a transversely-mounted pintle 34. A large, longitudinally-elongated tank 36 is pivotally attached to the pintle 34. Mounted on the rear of the tank 36 is a pickup mechanism 38.

The tank 36 pivots about the pintle 34, assuring that the pickup mechanism 38 is in continual contact with a feedlot surface 40.

Figure 2:
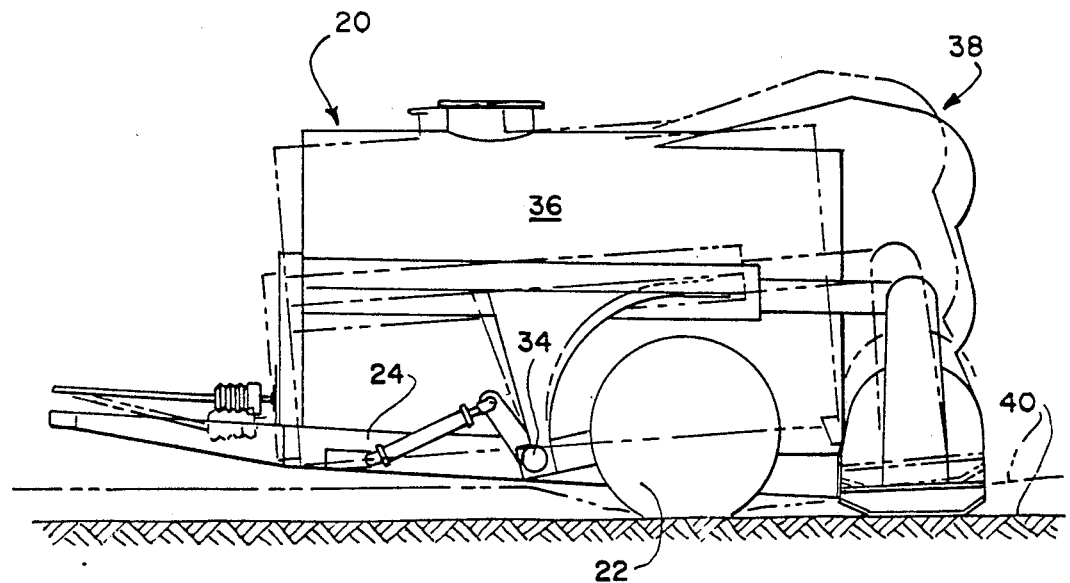
FIG 2 is a view similar to FIG. 1 of the manure gathering machine illustrating in phantom lines the tilting of the tank as the pick up device follows the ground contour.

The effect of the pivoting of the pintle 34 when the machine 20 is moving over uneven surfaces is illustrated in FIG. 2. The solid lines show the position of the manure gathering machine 20 as the pickup mechanism 38 is in contact with the feedlot surface 40 on level terrain. The phantom lines show the position of the manure gathering machine 20 when the machine's wheels 22 enter a depressed area within the feedlot The pickup mechanism 38 remains in constant contact with the feedlot surface 40.

An operator 42, driving the tractor 32, engages a power takeoff (PTO) mechanism 44 on the tractor 32. Power from the PTO mechanism 44 is transferred to the manure gathering machine 20 by means of a propeller shaft 46 which has two universal joints 48. Power from the PTO mechanism 44 is transferred by a series of mechanical components to be described later to the pickup mechanism 38. The pickup mechanism 38 is similar to that described in my U.S. Pat. No. 3,595,363.

As the operator 42 drives the tractor 32 in a forward direction, a transversely-elongated blade 50, which is attached to the lower portion of an arcuate rear wall 52 of the pickup mechanism 38, scrapes manure from the feedlot surface 40 after it enters an inlet opening 39 of the pickup mechanism 38. The manure accumulating on the inside of the back wall 52 of the pickup mechanism 38 is gathered by the leading edge of paddles shown generally at 54 of a lower drum 56 of the pickup mechanism 38. Manure that is flung from the lower drum 56 is then caught by the paddles 54 on a middle drum 58 and flung upward into the pathway of the paddles 54 of an upper drum 60. The manure is then flung by the paddles 54 on the upper drum 60 over the front wall 62 of the pickup mechanism 38, which also serves as the rear wall of the tank 36, and into the tank 36, as indicated by arrow 63. Any manure that may be flung between the drums 56, 58, and 60 and the front wall 62 of the manure pickup mechanism 38 and any manure that may drop from the paddles 54 is recaptured by the blade 50 and reenters the pickup mechanism. The tank 36 is initially partially filled with water. The manure which is collected is mixed with the water to form a slurry 61.

When the tank 36 is full, the operator 42 activates a hydraulic system 64 (not shown in detail) on the tractor 32. The hydraulic system 64 extends left and right hand hydraulic cylinders 66 and 68, respectively, to cause the bell crank levers 26 and 27 to rotate in a clockwise direction when viewed from the left of the manure gathering machine 20 relative to the pintle 34. This clockwise rotation causes the rear portion of the frame 24 to pivot upward about the drawbar 30 relative to the wheel 22.

Again referring to FIG. 1, left and right hand stops 70 and 72, respectively, are welded to the lower, outer rear portion of each side of the tank 36. As the bell crank levers 26 and 27 cause the rear portion of the frame 24 to rise, the pickup mechanism 38 remains in contact with the feedlot surface 40, since the tank 36 pivots about the pintle 34.

Figures 3, 4, 5:
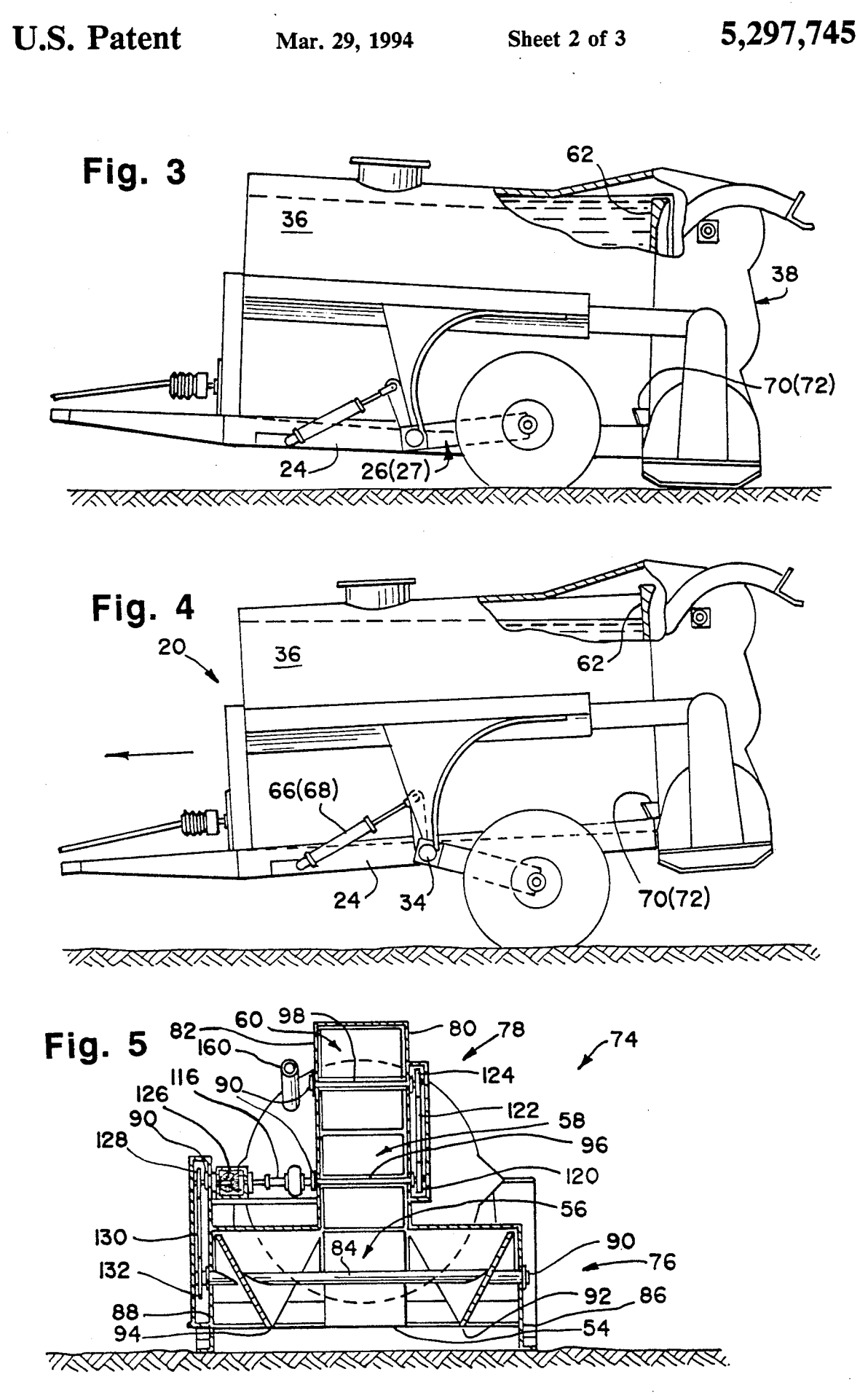

As the bell crank levers 26 and 27 further raise the rear portion of the frame 24, the upper rear portions of the frame 24 come in contact with stops 70 and 72, as illustrated in FIG. 3. Note that, in this position, the pickup mechanism 38 is still in contact with the feedlot surface 40. This Figure illustrates the position in which the rear portion of the tank 36 is in its lowest position relative to the front portion of the tank. In this position, if the tank 36 is overfilled, excess manure spills as shown over the top of the front wall 62 of the pickup mechanism 38. This feature prevents overfilling of the tank 36.

Now referring to FIG. 4, as the hydraulic cylinders 66 and 68 are further extended, the rear portion of the frame 24 and the rear portion of the tank 36, which is now fixed relative to the frame 24 by the pintle 34 and the stops 72 and 70, rise to provide the machine 20 with its upmost transport position. Note, in this position, that the front of the tank ,36 is in its most downward position relative to the rear of the tank. In this position, the manure level at the rear of the tank 36 is considerably below the top of the front wall 62 of the pickup mechanism 38. The distance between the manure level and the top of the rear wall 62 of the tank 36 assures the avoidance of manure spills during transport.

The pickup mechanism 38 of the manure gathering machine 20 is similar to that disclosed in my U.S. Pat. Nos. 3,348,652 and 3,595,363. The pickup mechanism in the prior patents was positioned in the front of the manure gathering machine. The pickup mechanism 38, as earlier stated, is located rearward of the tank 36, as illustrated in FIG. 1.

The pickup mechanism 38, as in FIGS. 1 and FIG. 5, is supported by the tank 36 through the sharing of the common wall 62 that serves as the rear wall of the tank and the front wall of an enclosure 74 on the pickup mechanism 38. The enclosure 74 has two sections, a lower stage enclosure 76 and an upper stage enclosure 78. The lower stage enclosure 76 has a generally cylindrical shape, with the bottom portion of the lower enclosure 76 being open to form the inlet opening 39 of the pickup mechanism 38. The front part of the lower enclosure 76 is attached to the rear wall 62 of the tank 36. The axis of the lower stage enclosure 76 is transversely located, extends for substantially all the width of the machine, and represents the lower portion of the enclosure 74.

The upper stage enclosure 78 consists of a generally rectangular shape with right and left-hand vertical side walls 80 and 82, respectively, the arcuate rear wall 52, shown in FIG. 1, and the front wall 62 which is common with the tank 36. The upper stage enclosure 78 is centrally located immediately above the lower stage enclosure 76. There is an opening between the lower stage enclosure 76 and the upper stage enclosure 78. The upper stage enclosure 78 has a top wall that extends above the top of the tank, in substantial clearance with the top of the rear wall 62 of the tank 36, and blends into the top of the tank 36.

Referring to FIG. 5, a lower stage shaft 84 is transversely centrally located in the lower stage 76 of the enclosure 74. The lower stage shaft 84 is supported on the right and left ends, 86 and 88, respectively, by bearings, indicated generally at 90.

Now referring to FIG. 1, the blade 50 is attached to the lower portion of the arcuate rear wall 52 of the pickup mechanism 38. This blade 50 runs transversely along the entire length of the lower stage enclosure 76 and is positioned in a forward leaning position. The blade 50 is placed so that it contacts the feedlot surface 40 during cleaning.

As the manure gathering machine 20 is moved in a forward position, manure collects on the front edge of the blade 50 and accumulates in the lower portion of the lower stage enclosure 76.

Again referring to FIG. 5, right and left-hand augers 92 and 94 are slidably fit and keyed to the lower stage shaft 84. The augers 92 and 94 have a right and a left-hand helix so that when rotated in a common direction the manure that has accumulated within the lower stage enclosure 76 is moved by the augers 92 and 94 to a central location within the lower stage enclosure 76.

The lower stage drum 56 is slidably fit and keyed to the lower stage shaft 84 between the right and left-hand augers 92 and 94, respectively. The manure that has accumulated in the central lower portion of the lower stage enclosure 76 is picked up by the paddles 54 of the lower drum 56 and flung to the lower portion of the upper stage enclosure 78.

The middle stage drum 58 is slidably fit and keyed to a central transversely mounted central stage shaft 96. The shaft 96 is supported on each end by bearings 90 mounted to the central lower portion of the upper stage enclosure 78 at the walls 80 and 82.

The manure that has reached the lower portion of the upper stage enclosure 78 along the rear wall 52 of the enclosure, is flung by paddles 54 located on the middle stage drum 58 and flung into the rear upper portion of the upper stage of the enclosure 78.

The upper drum 60 is supported by an upper stage shaft 98 that is slidably fit and keyed to the drum 60. The upper stage shaft 98 is supported on the right and left-hand walls 80 and 82, respectively, of the upper stage enclosure 78 by bearings 90. The manure arriving at the upper rear portion of the upper enclosure 78 is flung by the upper drum 60 over the rear wall 62 of the tank 36 and into the tank 36 as shown in FIG. 1.

Figure 6:
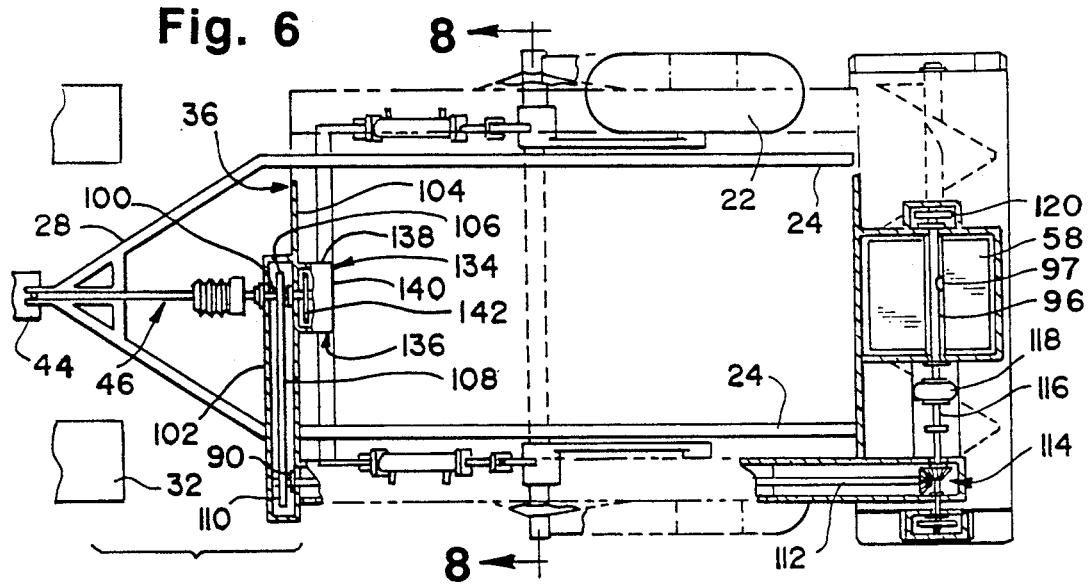
FIG. 6 is a plan view of the manure gathering machine illustrated in FIG. 1 with parts in section.

Referring to FIG. 6, power is transferred to the pickup mechanism 38 by means of a propeller shaft 46 located forwardly of the tank 36 above the yoke 28. The propeller shaft 46 is attached to the power takeoff (PTO) mechanism 44 of the tractor 32. The propeller shaft 46 is attached to an input shaft 100 on the manure gathering machine 20.

A front drive housing 102 is mounted on a front wall 104 of the tank 36. The housing 102 has an oval shape and extends from the lower central portion of the tank 36 where the propeller shaft 46 is attached to the left front corner of the tank 36. The input shaft 100 is slidably fit on each end by bearings 90 attached to the front drive housing 102 and the front wall 104 of the tank 36. An input sprocket 106 is slidably fit and keyed to the input shaft 100.

Power from the PTO mechanism 44 of the tractor 32 is transferred by the PTO shaft 46 to the input shaft 100 and then to the input sprocket 106. Power from the sprocket 106 is transferred by an input chain 108 from the input sprocket 106 to a front corner sprocket 110 which is slidably fit and keyed to a longitudinal shaft 112 which is supported by the bearing 90 located on the input drive housing 102 in the front and by a gearbox 114 in the rear. The longitudinal shaft 112 extends from the left outer front of the tank 36 to the gearbox 114 which is located on the left end of the pickup mechanism 38 along the axis of the central drum 58.

Power is then transferred from the gearbox 114 through a gearbox right output shaft 116 to a flexible coupling 118, which is used to avoid excess flexing of components along the central drum axis. The flexible coupling 118 is attached at its other end to the middle stage shaft 96. Power from the middle stage shaft 96 is transferred by a key 97 to the middle stage drum 58 and also to a right middle stage sprocket 120 that is slidably fit and keyed to the middle stage shaft 96 at its end opposite the coupling 118.

Referring to FIG. 5, power from the right middle stage sprocket 120 is transferred by an upper pickup chain 122 to an upper stage sprocket 124 which is slidably fit and keyed to the upper stage shaft 98. Power from the upper stage shaft 98 is transferred by a key to the upper stage drum 60.

Power from the gearbox 114 is transferred by the gearbox left output shaft 126 to a left middle stage sprocket 128 that is slidably fit and keyed to the shaft 126. Power from the left middle stage sprocket 128 is transferred by a lower stage pickup chain 130 to a lower stage sprocket 132 which is slidably fit and keyed to the lower stage shaft 84.

The manure and water within the tank 36 is mixed and distributed by a pump 134, as illustrated in FIG. 6. The pump 134 is attached to the central lower portion of the inside of the front wall 104 of the tank 36. The pump 134 has a cylindrical outer housing 136 that is attached at the inside of the front wall 104 of the tank 36. The housing 136 has a cylindrical casing 138 and an inner and outer face 140 and 142, respectively. The input shaft 100 extends axially through the housing 136 from the outer face 142 into the central portion of the pump 134.

Figure 7:
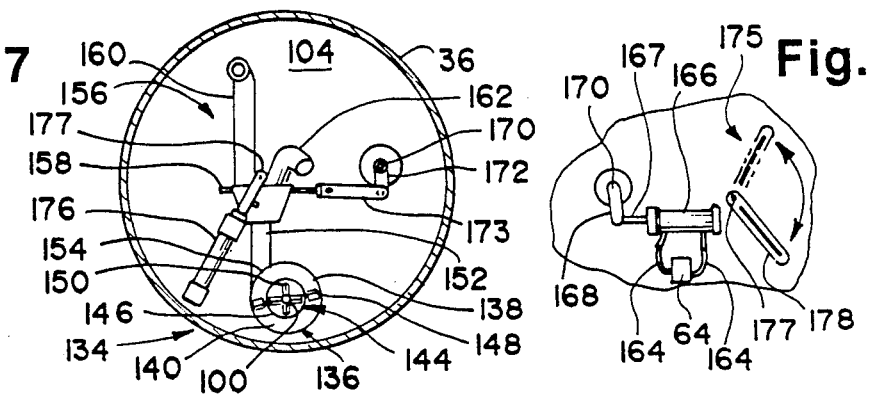
FIG. 7 is a reduced sectional view, taken generally along line 7—7 of FIG. 1.

Now referring to FIG. 7, an impeller 144 is attached to the end of the shaft 100 and the impeller 144 extends through a hole 146 in the inner face 140 of the housing 136. The impeller 144 is driven by the input shaft 100 and pulls water and manure from the tank 36 through the hole 146 in the housing 136 of the pump 134. Attached to the inner face 140 of the pump 134 are two shear bars 148, which are in minimal clearance to blades 150 located on the impeller 144. Stringy manure, such as manure mixed with straw, is chopped into fine particles by the cutting action of the blades 150 against the bar 148.

A valve inlet pipe 152 is tangentially attached at one end to an opening 154 in the pump cylindrical casing 138. The other end of the inlet pipe 152 is attached to one end of a two-position valve 156 which is mounted onto the inner face of the front wall 104 of the tank 36. Slidably located within the two-position valve 156 is a valve slide 158. On the other end of the two position valve 156 are an unload discharge pipe 160 and an agitate discharge pipe 162. The manure exits the pump 134 through the opening 154 in the cylindrical casing 138 and into the inlet pipe 152.

The operator 42 may select to use the pump 134 to agitate the manure in tank 36 or to pump the manure from the tank. The selection is made by activating the tractor hydraulic system 64 as now described.

Figure 7A:
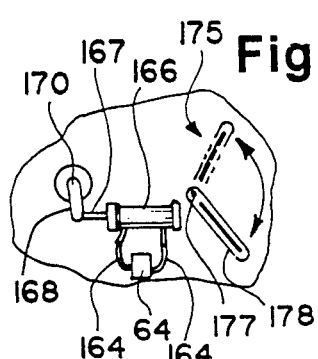
FIG. 7A is a fragmentary frontal elevation view of the tank of the manure gathering machine shown in FIG. 1.

Referring to FIG. 7A, the tractor hydraulic system 64 is connected by means of hydraulic hoses 164 to a valve hydraulic cylinder 166. The hydraulic cylinder 166 is mounted to the outside of the front wall 104 of the tank 36. Actuation of the hydraulic system 64 causes a ram 167 in the hydraulic cylinder 166 to rotate an outside lever arm 168 which extends from the outside end of a valve operating shaft 170 which is slidably fitted to the front wall 104 of the tank 36 The rotation of the shaft 170 causes an inside lever arm 172, which is pivotally attached to the inside end of the shaft 170 at one end of the arm 172, as shown in FIG. 7, to correspondingly pivot about the shaft 170. A connecting arm 173 is pivotally attached at one end to the other end of the inside lever arm 172 and at the other end to the valve slide 158. As the inside lever arm 172 rotates, the connecting arm 173 correspondingly move horizontally. The valve slide 158 has an opening (not shown) through which the manure from the inlet pipe 152 travels The connecting arm 173 moves the valve slide 158 to and from the discharge and agitate positions Depending on the position of the hydraulic cylinder 166, the manure in the inlet pipe 152 either returns to the tank through the agitate pipe 162 or travels into the unload pipe 160.

As illustrated in FIG. 5, the unload discharge pipe 160 extends longitudinally within the tank 36 from the two-position valve 156 through the rear wall 62 of the tank 36.

Now referring to FIG. 1, the unload discharge pipe 160 has a downward arcuate shape as it exits the tank 36. At the rear end of the unload discharge pipe 160 is a spreader 174 which spreads the slurry flowing from the pipe 160.

The operator 42 can select between an agitation mode and a discharge mode of operation of the manure gathering machine 20 by proper activation of the hydraulic system 64 on the tractor 32. The operator 42 will cause the hydraulic cylinder 166 to move to position the two-position valve 156 to permit either agitation or discharge of the manure.

The operator 42 while riding on the tractor 32 cannot observe the level of the manure through the opaque tank 36. A manure level indicator 175, as shown in FIG.

7A, is used to permit the operator 42 to monitor the tank manure level while sitting on the tractor 32.

A float 176, FIG. 7, extends radially from a float shaft 177 located centrally on the inside of the front wall 104 of the tank 36. The float shaft 177 is slidably fit through the front end 104 of the tank 36. An indicator arm 178, as shown in FIG. 7A, is attached at one end of the arm 178 to the shaft 177 and extends radially from the shaft 177 on the outside of the front wall 104 of the tank 36.

As the level of slurry rises, the float 176, being buoyant, rotates about the shaft 177 and causes a corresponding rotation of the indicator arm 178 located on the outer face of the front wall 104 of the tank 36. When the indicator arm 178 is in its "full" position, the tank 36 is full and the operator 42 can view this position of the arm 178 and is aware he/she should end the loading portion of the process.

Referring to FIG. 1, in order to lift the manure gathering machine 20, the operator 42 on the tractor 32 activates the hydraulic system 64 to elongate the right and left-hand hydraulic cylinders, 66 and 68, respectively. The hydraulic pressure from the tractor 32 is transferred to the hydraulic cylinders 66 and 68 through hoses 180. The extending of the hydraulic cylinders 66 and 68 causes the bell crank levers 26 and 27 to rotate clockwise when viewed from the left of the manure gathering machine 20, as shown in FIG. 1.

Figure 8:
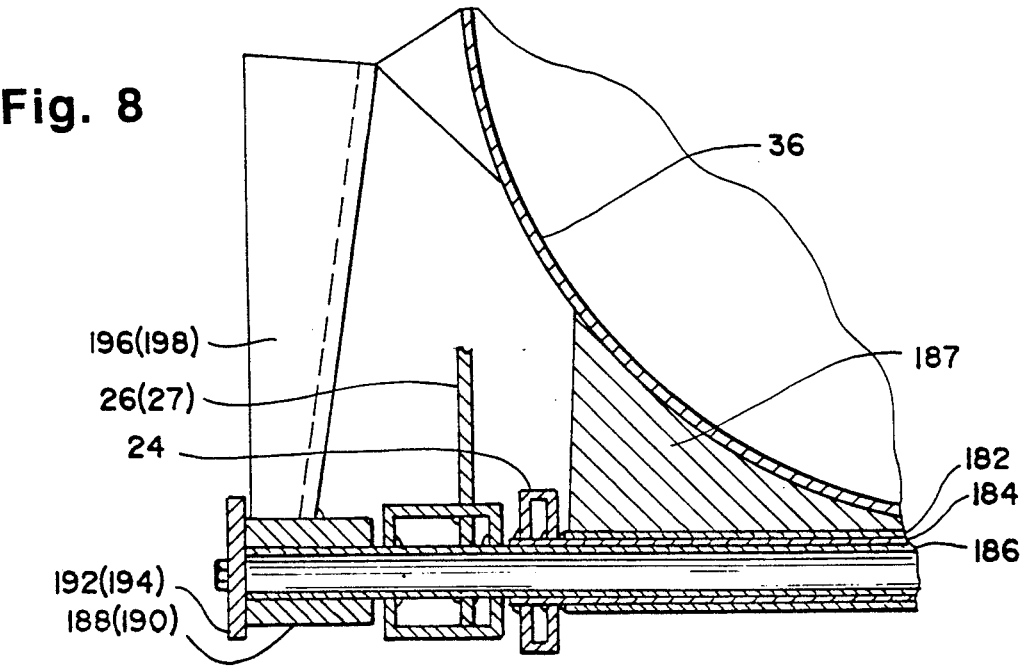
FIG. 8 is a fragmentary sectional view, on an enlarged scale, taken generally along line 8—8 of FIG. 6 and shows the pintle pivoting mechanism of the manure gathering machine.

The bell crank levers 26 and 27 are connected to the pintle 34, as shown in FIG. 8. The pintle 34 consists of an outer tube 182 with a 4" outside diameter, a middle tube 184 with a 3½" outside diameter which slidably fits within the outer tube 182, and a triple strength inner tube 186 with a 3" outside diameter that slidingly fits within the middle tube 184.

The outer tube 182 is transversely and centrally located immediately underneath the tank 36 and is welded to a cradle plate 187 that is welded to the lower ⅓ of the tank 36 immediately above the outer tube 182. The ends of the outer tube 182 are located near the inside of the longitudinal members of the frame 24 The middle tube 184 is slidably fit within the outer tube 182 and is slightly longer than the outer tube 182. The ends of the middle tube 184 extend through holes in the longitudinal support members of the frame 24 and are welded to the longitudinal members of the frame 24.

The inner tube 186 is slidably fit within the middle tube 184 and is longer than the middle tube 184. One end of each of the right and left bell crank levers 26 and 27, respectively, is welded to the outside of the inner tube 186 Right and left end tubes 188 and 190, respectively, are slidably fit over the ends of the inner tube 186. Right and left-hand end caps, 192 and 194, respectively, are fastened to the ends of the inner tube 186, restraining the end tubes 188 and 190. Right and left-hand outboard tank supports 196 and 198, respectively, are attached between the tank 36 and the end tubes 188 and 190, respectively.

As illustrated in FIG. 1, the right and left-hand bell crank levers 26 and 27, respectively, rotate about the pintle 34, previously described. As the right and left-hand cylinders 66 and 68 are extended, right and left cylinder arms 200 and 202, respectively, of the bell crank levers 26 and 27 are pushed rearwardly. Right and left wheel arms, 204 and 206, respectively of the bell crank levers 26 and 27 are consequentially forced downwardly. The wheel arms 204 and 206 of the bell crank levers 26 and 27 move the pintle 34 upwardly relative to the feedlot surface 40. Since the yoke 28 of the frame 24 is attached to the drawbar 30 of the tractor 32, the rear portion of the frame 24 moves upwardly.

Since the blade 50 on the pickup mechanism 38 which is attached to the tank 36 is in contact with the feedlot surface 40 and since the tank 36 is able to pivot with respect to the frame 24, about the pintle connection 34, as the pintle 34 rises, the blade 50 remains on the feedlot surface and the front of the tank 36 rises. Excess manure thereby spills over the top of the rear wall 62 of the tank 36 as shown in FIG. 3. As the rear of the frame 24 continues to rise relative to the tank 36, the stops 70 and 72 located on the lower outer rear portion of the tank 36 contact the rear portion of the longitudinal members of the frame 24 preventing further relative motion between the frame 24 and the tank 36.

The lifting continues until the transport position is reached, as shown in FIG. 4. Note that the rear of the tank 62 in the full upright position is slightly elevated from the front of the tank 36, increasing the distance between the top of the slurry and the top of the rear wall 62.

The machine 20 is then transported to either a lagoon in wet weather into which the slurry is pumped or onto a field in dry weather in which the slurry may be spread. To spread the slurry, referring to FIGS. 7 and 7A, the hydraulic cylinder 166 is activated to move the two-way valve 156 into its discharge position. With the valve 156 in this position, the pump 134 transfers the slurry from the inlet discharge pipe 152 of the pump 134 to the unload discharge pipe 160 to the rear of the machine 20. The slurry is diverted into a uniform spray by a spreader 174 as shown in FIG. 1, affixed to the discharge pipe 160. The tractor 32 with the machine 20 attached is driven through the field with the slurry being sprayed from the machine, distributing the manure evenly over the field.

In order to unload the slurry into a lagoon, the spreader 174 is removed from the discharge pipe 160 and the machine 20 is backed down a ramp leading into the lagoon. The hydraulic cylinder 166 is activated to move the two-way valve 156 into its discharge position. The pump 134 then is used to unload the tank 36.

The machine 20 can, at a later time when weather conditions are dry, be backed down the ramp until the lower enclosure 76 of the pickup mechanism 38 is partially submerged in the lagoon The pickup mechanism 38 will then be used to draw slurry from the lagoon to be spread onto the field.

The mixing of water with the manure to form a slurry with a constant and desired moisture content results in an easily-spread liquid Pumping the fluid through a discharge tube 160 and onto a spreader 174 results in a uniform distribution pattern of the manure.

The location of the pickup mechanism 38, behind the tank 36, as well as the counterclockwise rotation of the drums 56, 58, and 60 (as viewed from the left side of the machine) permits the manure to travel over the back wall 62 of the enclosure 74 and into the tank 36. Manure which may be dropped from the paddles 54 as they return on their downward motion near the front wall 62 of the enclosure 74 will fall to the feedlot surface 40 in front of the blade 50 to be picked up again by the drums 56, 58, 60. The unique location of pickup 38 at the rear of the machine 20 and the path of the manure, up the rear wall 52 of the pickup 38 and forwardly into the tank 36, provides an efficient pick up of manure.

The ability of the tank 36 and pickup mechanism 38 to rock forward and aft about the pintle 34 with respect to frame 24 and wheels 22, permits the blade 50 of the pickup mechanism 38 to be in constant contact with the feedlot surface 40 to greatly improve the quality and efficiency of the cleaning operation. This action is illustrated in FIG. 2 where the tank 36 and pickup mechanism 38 are shown in two angularly offset positions depending on the contour of the surface 40.

The unique combination of the right and left bell crank levers 26 and 27, the pintle 34, and the stops 70 and 72 assure that the manure gathering machine 20 will not leave the feedlot with the tank 36 overfilled. The inherent rearward tilt of the tank 36 during the lifting process, as shown in FIG. 3, assures excess slurry to leave the tank 36 and be left harmlessly on the feedlot surface 40. Problems with manure spillage during transport are thereby avoided.

A further advantage of this machine is its ability to discharge manure into a lagoon during unfavorable conditions when the field is too wet for vehicular traffic or when a crop is growing in the field. This feature of the machine permits cleaning of a feedlot every day of the year.

Another advantage of the rear-mounted pickup machine 20 is that the machine 20 can be backed into corners or alleys within a feedlot, the pickup mechanism 38 energized, and the machine driven forward to clean the corners more completely than a front-mounted pickup machine.

Another advantage of the machine 20 is that its ability to pick up liquid manure from feedlots or lagoons aids in compliance with present government disposal requirements by disposing of waste water as well as manure.

Another advantage of the machine 20 is that the use of an enclosed tank prevents all splatter of manure during transport allowing a more thorough cleaning of the feedlot and fewer spills on roadways.

This unique manure-collecting method assures an even distribution of manure onto a field by utilizing a unique method of mixing water in such proportions with the manure to form a slurry with a consistent viscosity and moisture content. This machine further provides for a more efficient pickup of loose and gummy material by having a counterclockwise drum rotation arrangement and rear drum location to provide for manure flow up the rear wall of the pickup mechanism 38 and to direct the manure from the rear wall 52 across the top of the pickup mechanism 38 and into the tank 36. Manure that escapes on the return travel of the drums is thereby placed in front of the pickup blade 50 to be picked up, again, by the pickup mechanism 38. The unique pintle 34 permits the tank 36 and pickup mechanism 38 to rock fore and aft The blade 90 is thereby in constant contact with the feedlot which permits much more complete and efficient cleaning of the feedlot surface 40. The combination of the bell crank levers 26 and 27, stops 70 and 72, and pintle 34 permit an inherent rear tipping of the tank 36 during lifting to assure that the tank 36 is never overfilled. Spills during transport are thereby avoided.

Still other aspects, objects, and advantages of the present invention can be obtained from a study of the specification, the drawings, and the appended claims.

What is claimed is:

1. A manure gathering machine for a feedlot or barnyard comprising:
   a mobile manure tank for movement in a forward direction over the ground through an area to be cleaned, said tank having a rear end defined by a rear wall with a filling opening at an upper portion of said rear wall; and
   means for picking up manure from the ground, in a zone behind said rear wall of said tank as said tank moves forwardly through the area, and for lifting the picked up manure and directing the picked up manure forwardly to said filling opening of said tank, whereby picked up manure which does not reach said tank falls to the ground between said rear wall of said tank and said manure picking up means and is again picked up as said tank moves through the area.

2. The machine of claim 1 wherein said manure picking up means comprises:
   a manure pickup mechanism housing extending rearwardly from said rear wall of said tank and upwardly from the ground to said filling opening, said housing having a rear wall spaced rearwardly from said rear wall of said manure tank; and
   a manure pickup mechanism located inside said mechanism housing, manure being picked up in a zone between said rear wall of said tank and said rear wall of said housing, said mechanism including a manure lifting means for lifting the picked up manure along said rear wall of said housing and directing the picked up manure forwardly to said filling opening of said tank.

3. The machine of claim 2 wherein said manure pickup mechanism housing has an inlet opening for receiving manure therethrough located behind said rear wall of said tank and said manure lifting means includes rotatable lower paddles that rotate past said inlet opening towards said rear wall of said housing, throwing manure rearwardly and upwardly.

4. A transportable manure gathering machine for a feedlot or barnyard comprising:
   a frame;
   wheels on said frame for movement of said manure gathering machine;
   a tank pivotally mounted on said frame for collecting manure;
   a manure pickup mechanism mounted on said tank, said mechanism comprising a means for picking up manure from the ground as said manure gathering machine moves through an area to be cleaned and a means for depositing the picked up manure in said tank; and
   means for moving said tank between a first position with the pickup mechanism resting on the ground, the tank pivoting on the frame whereby the pickup mechanism follows the ground contour as said manure gathering machine moves through the area to be cleaned, and an elevated position with the pickup mechanism, spaced from the ground for transport of said manure gathering machine from one area to another.

5. A transportable manure gathering machine for a feedlot or barnyard comprising:
   a frame having a longitudinal axis;
   wheels on said frame, one on either side of said axis, for movement of said manure gathering machine;
   a receiving tank pivotally mounted on said frame for pivotal movement about an axis transverse to said longitudinal axis of said frame, said receiving tank having a filling opening whereby manure may be deposited; and
   manure handling means located at an end of said receiving tank for picking up manure from the ground and for lifting the manure to said filling opening, whereby said tank pivots about said transverse axis and said manure handling means follows the ground contour as said manure gathering machine moves through the area to be cleaned.

6. The manure gathering machine of claim 5 further including means for moving said receiving tank from a first position having said manure handling means on the ground successively to a second position having said manure handling means on the ground and the filling opening at a lower position relative to the tank in order to spill excess manure slurry from said tank and to a third position having said manure handling means raised above the ground and said filling opening elevated relative to the tank, for transport of said manure gathering machine from one location to another.

7. The manure gathering machine of claim 6 in which said frame has a forward end with a hitch fitting connectable with a tractor, said filling opening and said manure handling means are located at a rear end of said tank and said transverse axis is forward of the center of gravity of said tank, and a lifting means to lift said frame with respect to said wheels, said frame pivoting about said hitch.

8. The manure gathering machine of claim 7 in which said frame has two longitudinal members which extend from a forward end of said frame to a point rearward of said transverse axis, said tank having stops rearward of said transverse axis engageable by said frame members as said frame is lifted, to tilt said receiving tank to said third position.

9. A manure gathering machine for a feedlot or barnyard comprising:
a longitudinally elongated frame;
a pintle with an axis transverse to the longitudinal axis of said frame centrally located on said frame;
a tank pivotally supported by said pintle at a position on said tank forward of the center of gravity of said tank;
a lifting assembly including wheels attached to said frame, pivoting about said pintle for raising said frame with respect to said wheels; and
a manure pickup mechanism located at the rear of said tank 10. The machine of claim 9 wherein said lifting assembly comprises a bell crank lift with two fixedly connected arms pivotally attached to said pintle, a wheel lifting assembly attached to a first arm of said lift, and an actuator attached to a second arm whereby said bell crank lift is used to raise said frame with respect to said wheel.

11. The machine of claim 9 wherein said lifting assembly comprises a right lifting assembly and a left lifting assembly at the ends of said pintle.

12. The machine of claim 9 wherein said pintle consists of three coaxial tubes: an outer tube attached to said tank, a middle tube attached to said frame, and an inner tube attached to said lifting assembly.

13. A manure gathering machine for a feedlot or barnyard comprising:
a longitudinally elongated frame;
a pintle with an axis transverse to the longitudinal axis of the frame centrally located on said frame, said pintle comprising three coaxial tubes, a middle tube attached to said frame, an outer tube located outside said middle tube, and an inner tube located inside said middle tube;
a tank attached to said outer tube, said tank having a manure storage area and a filling opening, said tank pivotally supported by said pintle at a position on said tank forward of the center of gravity of said tank, said tank has stops on said frame that limit the rear downward rotation of said tank relative to said frame;
a manure pickup mechanism located at the rear of said tank;
a right bell crank lifting mechanism and a left bell crank lifting mechanism each comprising a bell crank lift with two fixedly connected arms, said lift pivotally attached to said pintle, a wheel-support assembly attached to said first arm of said lift, and an actuation mechanism attached to said second arm whereby said bell crank lift is used to raise said frame with respect to said wheel, thereby creating as said tank is being raised, three positions, said first position having said manure pickup mechanism on the ground successively to said second position having said manure pickup mechanism on the ground and the filling opening at a lower position relative to said tank in order to spill excess manure from said tank and to a third position having said manure pickup mechanism raised above the ground and said filling opening elevated relative to the tank, for transport of said manure gathering machine from one location to another;
a pump connected to said tank for mixing water and manure in said manure storage area in said tank to form a slurry; and
a directing means to direct said slurry to provide a discharge from or an agitation within said tank.

14. The machine of claim 13 wherein said inner tube is affixed to both bell crank lifting mechanisms, thereby avoiding unequal lifting of tank by said right and left bell crank lifting mechanisms.

15. The machine of claim 13 wherein said middle tube is journaled to said bell crank lifting mechanisms.

16. The machine of claim 13 having outboard tank supports supported through bearings by said inner tube.

17. The machine of claim 13 in which said right and left lifting mechanisms each include a hydraulic cylinder connected between the frame and second arm of each bell crank mechanism.

18. The machine of claim 17 wherein said two hydraulic cylinders are hydraulically balanced by a flow divider to avoid unequal lifting of tank by right and left bell crank lifting mechanisms.

19. The machine of claim 13 wherein said pump has an impeller with a knife which rotates against a shear bar whereby long fibers of manure are chopped.

20. The machine of claim 13 wherein said directing means comprises a remotely controlled, hydraulically operated valve.

21. The machine of claim 13 wherein said discharge from said tank is accomplished through a rear mounted long goose neck tube connected to said pump.

* * * * *